United States Patent Office 3,766,246
Patented Oct. 16, 1973

3,766,246
PROCESS FOR THE PREPARATION OF ALKYL 4,4'-DICHLOROBENZILATES AND 4,4'-DICHLOROBENZILIC ACID
Yair Sprinzak, Rehovoth, Israel, assignor to Yeda Research and Development Co., Ltd., Rehovoth, Israel
No Drawing. Filed Nov. 5, 1968, Ser. No. 773,642
Claims priority, application Israel, Nov. 7, 1968, 28,906
The portion of the term of the patent subsequent to Oct. 24, 1989, has been disclaimed
Int. Cl. C07c 69/76
U.S. Cl. 260—473 A          6 Claims

ABSTRACT OF THE DISCLOSURE

Process for the preparation of alkyl 4,4'-dichlorobenzilates by oxidizing a corresponding alkyl bis-4-chlorophenylacetate in the presence of quaternary ammonium hydroxide catalysts and for the preparation of the 4,4'-dichlorobenzilic acid by subjecting the alkyl 4,4'-dichlorobenzilate obtained to hydrolysis.

BACKGROUND OF THE INVENTION

(1) Field of the invention

The present invention relates to a new proces for the preparation of alkyl 4,4'-dichlorobenzilates and for the preparation of the 4,4'-dichloorbenzilic acid.

(2) Description of the prior art

As described, for example in R. Gasser, Experientia, vol. VIII/2, p. 65 (1952), alkyl 4,4'-dichlorobenzilates are useful for destroying vermin and, in particular, may be utilized as acaricides. 4,4'-dichlorobenzilic acid is useful as starting material for the preparation of other acaricides.

The process previously utilized for the preparation of these alkyl 4,4'-dichlorobenzilates have not been found to be satisfactory. Usually they require several reaction steps which makes such syntheses expensive, cumbersome and reduce the product yield thereof. Moreover, the products obtained are not always very pure.

It is thus the principal object of the present invention to develop a process for the preperation of alkyl 4,4'-dichlorobenzilates, which does not require many steps, can be easily performed, gives good yields and produces pure products.

SUMMARY OF THE INVENTION

The present invention relates to a process for the preparation of alkyl 4,4'-dichlorobenzilates which comprises oxidizing the corresponding alkyl bis-4-chlorophenylacetates with oxygen in the presence of catalytic amounts of quaternary ammonium hydroxides having the formula $R_4NOH$, in which R stands for alkyl, aryalkyl, aryl, or heterocyclic radicals in a suitable solvent.

The alkyl 4,4'-dichlorobenzilates formed by said oxidation step may be subjected to hydrolysis to obtain the 4,4'-dichlorobenzilic acid.

PREFERRED EMBODIMENTS OF THE INVENTION

The reaction which is carried out in accordance with the present process proceeds in accordance with the following equation:

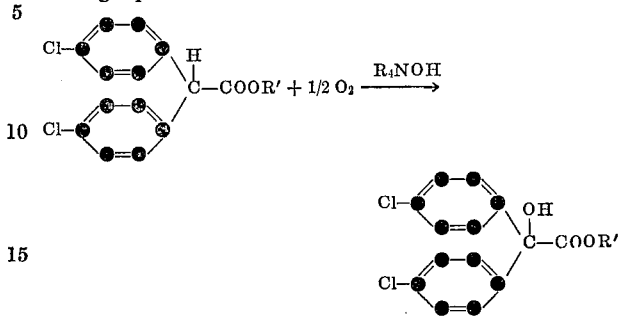

In the above equation R stands for organic moieties of the quaternary ammonium hydroxide catalyst which may, as noted above, comprise alkyl, aralkyl, aryl or heterocyclic radicals. Alkyl groups so useful include, e.g., methyl, ethyl, octyl, dodecyl etc. Aralkyl radicals which may be employed include e.g. benzyl. The useful aryl radicals comprise e.g. phenyl and naphthyl.

Particularly preferred catalysts which have been found useful in the process of this invention include tetramethyl ammonium hydroxide, benzyltrimethyl ammonium hydroxide, benzyltriethyl ammonium hydroxide and phenyltrimethyl ammonium hydroxide.

The R' moiety of the alkyl bis-4-chlorophenylacetate identified in the above equation may be any substituted or unsubstituted alkyl radical, suitably those having from 1 to 5 carbon atoms in the alkyl chain, e.g., ethyl, n-propyl, isopropyl. Such materials are known per se, having been identified and prepared as described, for example, in Org. Synth. Coll., vol. III, p. 270 (1955). The reaction is carried out in a suitable solvent for the alkyl bis-4-chlorophenylacetate reactant; pyridine, its alkyl homologues, and various dialkyl formamides having been particularly useful for such purpose. Preferred solvents for the practice of the present process include dimethyl formamide, diethyl formamide, pyridine, α-picoline and 2,4,6-trimethyl pyridine.

The oxidation reaction may be carried out employing any suitable source of oxygen, e.g., pure oxygen or air.

The reaction is preferably performed at temperatures which are at or below room temperature. Especially suitable are temperatures of from about −10° to about +25° C. (All temperatures are indicated herein in degrees centigrade.)

The hydrolysis is preferably an alkaline one and is performed under conditions known per se, e.g. by boiling the ester with an aqueous-alcoholic solution of an alkali metal hydroxide, such as potassium hydroxide, thus yielding the alkali metal salt, which salt is then treated with a mineral acid, e.g. sulfuric acid, as the result of which treatment the acid is set free and precipitated.

The invention will now be illustrated by the following examples without being limited by them.

EXAMPLE 1

A solution of 30.9 g. (0.1 mol) of ethyl bis-4-chlorophenylacetate in 120 ml. of pyridine was stirred in an oxygen atmosphere at 0°. To this solution was gradually added in the course of about one hour, 1 ml. of a 38% aqueous solution of benzyltrimethyl ammonium hydroxide. After 1.25 l. of oxygen (measured at room temperature and ordinary pressure) had been absorbed, the stirring was terminated and the solvent was distilled off at reduced pressure. Petroleum ether was added to the oily residue and the solution obtained was washed in succession with water, diluted hydrochloric acid and water. Finally, the petroleum ether was distilled off, at the beginning at ordinary pressure and then at reduced pressure. There was obtained 31.5 g. of ethyl 4,4'-dichlorobenzilate; B.P.$_{0.65}$ 175°.

EXAMPLE 2

The procedure described in Example 1 was repeated, substituting 120 ml. of dimethyl formamide for the pyridine solvent.

The residue obtained after the dimethyl formamide had been distilled off at reduced pressure was washed with water and dried at reduced pressure. There was obtained 31.5 g. of ethyl-4,4'-dichlorobenzilate.

EXAMPLE 3

The reaction was performed as described in Examples 1 and 2 utilizing as solvent 120 ml. of diethyl formamide to yield 30.5 g. of the ethyl 4,4'-dichlorobenzilate.

EXAMPLE 4

The reaction was performed as in Example 1, utilizing as catalyst 0.5 ml. of a 25% aqueous solution of tetramethyl ammonium hydroxide. Yield 31.8 g. of ethyl 4,4'-dichlorobenzilate.

EXAMPLE 5

The reaction was performed as described in Example 1 utilizing as catalyst 2 ml. of a 31% ethanolic solution of benzyltriethyl ammonium hydroxide. Yield 30.1 g. of ethyl 4,4'-dichlorobenzilate.

EXAMPLE 6

The reaction was performed as described in Example 1 utilizing as catalyst 2 ml. of an 18% aqueous solution of phenyltrimethyl ammonium hydroxide. Yield 30.9 g. of ethyl 4,4'dichlorobenzilate.

EXAMPLE 7

The reaction was performed as described in Example 1 utilizing as solvent 120 ml. of α-picoline. Yield 31.3 g. of ethyl 4,4'-dichlorobenzilate.

EXAMPLE 8

The reaction was performed as described in Example 1 utilizing as solvent 120 ml. of 2,4,6-trimethyl pyridine. Yield 30 g. of ethyl 4,4'-dichlorobenzilate.

EXAMPLE 9

The reaction was performed as described in Example 1 with the exception that it proceeded at 20°, utilizing as starting material 32.3 g. of isopropyl bis-4-chlorophenylacetate. After the solvent had been distilled off, water was added and isopropyl 4,4'-dichlorobenzilate crystallized. The crystals were filtered off, washed with water and dried, M.P. 62.5-64.5°. Yield 32.6 g. After recrystallization from petroleum ether the M.P. was 66-66.5° and the B.P.$_{0.55}$ 165°.

EXAMPLE 10

The reaction was performed as described in Example 1 utilizing as starting material 32.3 g. of propyl bis-4-chlorophenylacetate. There was obtained 32.6 g. of oily propyl 4,4'-dichlorobenzilate, B.P.$_{0.55}$ 172°.

EXAMPLE 11

A mixture of 32.5 g. of ethyl 4,4'-dichlorobenzilate, 10 g. of potassium hydroxide and 125 ml. of ethanol was refluxed for 1 hour. The mixture was then diluted with water, most of the alcohol was distilled off at reduced pressure and, after cooling, a small quantity of insoluble material was removed by filtration. Upon acidification of the clear solution with hydrochloric acid, 4,4'-dichlorobenzilic acid precipitated as a thick oil which crystallized on standing. Yield 28 g., M.P. 93-96°. After recrystallization from benzene-petroleum ether mixture, the product melted at 98-100°.

I claim:

1. A process for the preparation of alkyl 4,4'-dichlorobenzilates which comprises oxidizing the corresponding alkyl bis-4-chlorophenylacetate with oxygen in the presence of a catalytic amount of a quaternary ammonium hydroxide selected from the group consisting of benzyltrimethylammonium hydroxide, benzyltriethylammonium hydroxide tetramethylammonium hydroxide and phenyltrimethylammonium hydroxide, in a solvent selected from the group consisting of pyridine, its alkyl homologues and dialkyl formamides and wherein the catalyst is added gradually during the oxidation.

2. A process according to claim 1, wherein the reaction is performed at or below room temperature.

3. A process according to claim 2, wherein the reaction is performed at −10° to 25° C.

4. A process according to claim 1, wherein the solvent is dimethyl formamide, diethyl formamide, pyridine, α-picoline or 2,4,6-trimethylpyridine.

5. A process according to claim 1, wherein the oxidation is performed with air.

6. A process according to claim 1, wherein the alkyl 4,4'-dichlorobenzilate formed by the oxidizing step is subsequently alkaline hydrolylzed to the corresponding free acid.

References Cited

Fieser et al.: Organic Chemistry, Rheinhold Publishing Corp., N.Y., 1956., p. 228.
Fieser et al.: ibid., p. 178.
Russell et al.: J. A. Chem. Soc., 88, 5491 (1966).
Auramoff et al.: J. Am. Chem. Soc., 85, 1655 (1963).
Sprinzak: J. Am. Chem. Soc., 80, 5449 (1958).

LORRAINE A. WEINBERGER, Primary Examiner

J. F. TERAPANE, Assistant Examiner

U.S. Cl. X.R.

260—520